United States Patent [19]

Espelage

[11] 4,290,001
[45] Sep. 15, 1981

[54] CLOSED LOOP, MICROCOMPUTER CONTROLLED PULSE WIDTH MODULATED INVERTER-INDUCTION MACHINE DRIVE SYSTEM

[75] Inventor: Paul M. Espelage, Salem, Va.

[73] Assignee: General Electric Company, Schenectady, N.Y.

[21] Appl. No.: 63,126

[22] Filed: Aug. 3, 1979

[51] Int. Cl.³ .......................... H02P 5/34; H02P 7/42
[52] U.S. Cl. .................................. 318/811; 318/802; 318/805
[58] Field of Search .............................. 318/798–803, 318/805, 810, 811

[56] References Cited
U.S. PATENT DOCUMENTS

| | | | |
|---|---|---|---|
| 3,538,420 | 11/1970 | Klein | 318/810 X |
| 3,593,083 | 7/1971 | Blaschke | 318/803 |
| 3,775,652 | 11/1973 | Bowler et al. | 318/810 X |
| 4,028,599 | 6/1977 | Zankl et al. | 318/810 X |
| 4,078,192 | 3/1978 | Fultz | 318/799 |
| 4,099,107 | 7/1978 | Eder | 318/802 |

Primary Examiner—J. V. Truhe
Assistant Examiner—Richard M. Moose
Attorney, Agent, or Firm—William H. Steinberg; James C. Davis, Jr.; Paul R. Webb, II

[57] ABSTRACT

Closed loop control of a pulse width modulated inverter-induction machine drive system is accomplished with a pair of microcomputers. The first microcomputer generates a periodic interrupt signal and a reference signal representative of the desired magnitude of a preselected induction machine parameter, the reference signal varying in frequency and amplitude in accordance with an externally-varied frequency value and amplitude value, respectively. The second microcomputer, when interrupted by the first microcomputer, computes the difference between the first microcomputer reference signal magnitude and the actual preselected machine parameter magnitude and the difference between the actual inverter output current magnitude and a preset limit, and controls inverter thyristor conduction accordingly.

7 Claims, 6 Drawing Figures

CLOSED LOOP, MICROCOMPUTER CONTROLLED PULSE WIDTH MODULATED INVERTER-INDUCTION MACHINE DRIVE SYSTEM

BACKGROUND OF THE INVENTION

This invention relates to a control system for a pulse width modulated inverter-induction machine drive system and, more specifically, to a control system which utilizes feedback of an induction machine parameter for regulation of inverter thyristor switching intervals to achieve good inverter-induction machine drive system performance.

The ability to control both torque and speed of an induction machine, particularly in response to varying load conditions, is often desirable. Since the torque and speed of the induction machine are dependent on the amplitude and frequency, respectively, of the voltage supplied to the machine stator, machine torque and speed can be controlled by conditioning, that is, varying, the amplitude and frequency of induction machine stator voltage.

Conditioning of induction machine stator voltage is commonly achieved by use of an inverter coupled between a source of low frequency potential and the induction machine. The inverter typically comprises a plurality of pairs of serially-connected solid state switching devices, either high power transistors or thyristors, thyristors being preferred for high current operation, which switching device pairs are coupled in parallel across the low frequency potential source. The junction between switching devices of each inverter switching device pair is coupled to a respective phase of the induction machine. Rendering each of the switching devices of each switching device pair conductive in an appropriate sequence allows a voltage to be supplied to the machine stator, causing the induction machine to become excited. By controlling the frequency and duration of inverter solid state switching device conduction, induction machine stator voltage can be conditioned and hence machine torque and speed can be varied accordingly.

A common technique for controlling the conduction of inverter solid state switching devices is that of pulse width modulation whereby each of the solid state switching devices of each pair of solid state switching devices is alternately rendered conductive at a frequency more than twice the desired inverter output voltage frequency, producing an inverter output voltage waveform comprised of a series of positive and negative voltage pulses. The output voltage pulse width and hence, the inverter output voltage amplitude is controlled by adjusting the conduction duration of each inverter solid state switching device. The inverter output voltage frequency is determined by the solid state switching device conduction frequency.

Heretofore, analog feed-forward strategies such as the triangle interception method, described in the paper "Pulse Width Modulated Inverter Motor Drives With Improved Modulation" by Jacob Zubek et al. presented at the 1974 IEEE-IAS Annual Meeting in Pittsburgh, Pa. and published in the Conference Record in 1975, have been applied to inverter-induction machine drive systems to achieve pulse width modulation inverter operation. To achieve optimum induction-inverter machine drive performance using the triangle interception method, it is necessary to operate the inverter in several different modes in accordance with machine frequency. At low frequencies, the triangle reference waveform is unsynchronized with the sinusoidal reference waveform. As the fundamental machine frequency increases, the triangle reference waveform frequency must be synchronized to some multiple of three times the fundamental sinusoidal reference waveform frequency to avoid subharmonics in the inverter output voltage waveform. At still higher machine frequencies, when the magnitude ratio of the triangle reference waveform frequency to the sinusoidal reference waveform frequency becomes low because of inverter solid state switching device constraints, the lower order output voltage harmonics must be eliminated while still maintaining control of inverter output voltage. To obtain maximum inverter output voltage, pulse width modulation of inverter solid state switching devices is discontinued and each switching device is rendered conductive only once during each cycle of the inverter output voltage waveform. Consequently, analog implementation of the triangle interception method is complex because of the necessity to transition between each of the various modes without an objectionable jump in inverter output voltage.

In contrast, the present invention concerns a simple, digital apparatus which utilizes feedback control of an induction machine parameter, such as air gap flux, to achieve pulse width modulation of inverter solid state switching device conduction intervals to provide good inverter-induction machine drive performance.

BRIEF SUMMARY OF THE INVENTION

Briefly, in accordance with the preferred embodiment of the invention, improved apparatus for use with an n-phase inverter-induction machine drive system where n is an integer greater than zero, for controlling the torque and speed of the induction machine by controlling the amplitude and frequency of inverter output voltage in accordance with an externally-varied amplitude value and a frequency value, respectively, comprises a sensor circuit for generating an n-phase output signal from inverter output voltage and inverter output current which n-phase output signal varies in accordance with the actual magnitude of a preselected inverter-induction machine drive system parameter, such as induction machine air gap flux.

Processor means are coupled to the sensor circuit and the inverter and generate an n-phase reference signal, representative of the desired magnitude of the preselected induction machine parameter and varying in amplitude and frequency in accordance with the externally-varied amplitude value and frequency value, respectively. In accordance with a prescribed relationship between the magnitude deviation of the processor-generated reference signal from the sensor circuit output signal and the magnitude deviation of actual inverter output current from a preset limit, the processor means generates an n-phase control signal for controlling conduction of each of the inverter solid state switching devices to regulate inverter output voltage and hence induction machine torque and speed.

It is an object of the present invention to provide a microcomputer-based controller for achieving pulse width modulation operation of an inverter-induction machine drive system;

It is another object of the present invention to provide a control apparatus for achieving pulse width modulation operation of an inverter-induction machine drive system by feedback of an induction machine parameter, to provide for regulation of induction machine torque and speed.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
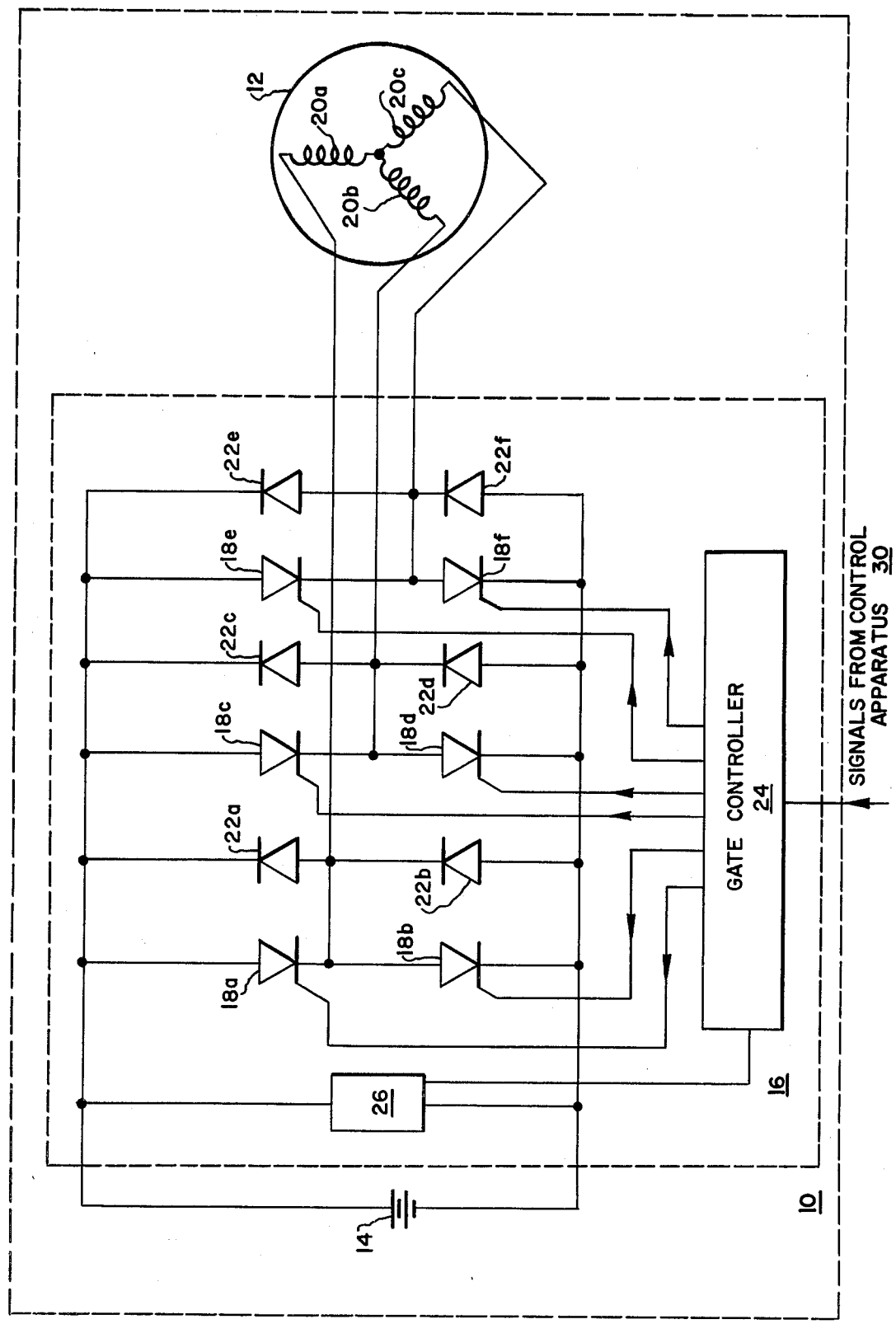
FIG. 1 is a schematic diagram of an inverter-induction machine drive system for use with the present invention.

FIG. 1 illustrates an inverter-induction machine drive system 10 for use with the control apparatus of the present invention. Inverter-induction machine drive system 10 comprises an induction machine 12 which is excited from a potential source 14 by an inverter 16. The structure of inverter 16 is dependent on the number of phases of induction machine 12 and the nature of potential source 14. Induction machine 12 is typically a three phase induction machine and potential source 14 comprises a DC source, shown as a battery. Therefore, inverter 16 comprises three pairs of controlled unidirectional conduction means, such as thyristors 18a and 18b, 18c and 18d and 18e and 18f, the thyristors of each thyristor pair being coupled in series aiding fashion across potential source 14. The junction between each of thyristors 18a and 18b, 18c and 18d and 18e and 18f is coupled to a respective one of phases 20a, 20b and 20c of induction machine 12.

Each of rectifiers 22a, 22b, 22c, 22d, 22e and 22f is coupled in parallel opposition with a respective one of thyristors 18a, 18b, 18c, 18d, 18e and 18f. During inverter 16 operation, each of rectifiers 22a-22f provides a conduction path across an associated one of thyristors 18a-18f, respectively, for commutation current and reactive load current.

A thyristor firing circuit, shown as gate controller 24, supplies gating signals to the gate of each of thyristors 18a-18f, respectively, in accordance with signals supplied from a control apparatus, (not shown) to render the thyristors of each thyristor pair alternately conductive in sequence for intervals of varying duration, to cause induction motor 12 to be supplied with stator current. Various thyristor firing circuits exist and selection of such a thyristor firing circuit will necessarily depend on inverter design considerations. Therefore, the details of gate controller 24 are not shown. For a further, more detailed description of such thyristor firing circuits, reference should be had to *The General Electric Silicon Controlled Rectifier Handbook,* published by Semiconductor Products Department of General Electric Company, Syracuse, New York (1973).

A thyristor commutation circuit 26 is coupled in parallel with thyristor pairs 18a and 18b, 18c and 18d and 18e and 18f and supplies a reverse-bias potential in response to control signals from gate controller 24, to reverse bias and hence commutate a selected one of thyristors 18a-18f after conduction. Various thyristor commutation circuits exist and selection of such a circuit will depend on design parameters. Therefore, the details of thyristor commutation circuit 26 are not shown. For a further, more detailed description of thyristor commutation circuits, reference should be had to the paper "Thyristor Commutation in DC Choppers—A Comparative Study" by William McMurray, published in the 1977 IEEE/Industry Application Society Annual Conference Record.

Pulse width modulation operation of inverter 16 is achieved by rendering the thyristors of each thyristor pair alternately conductive for intervals of varying duration with the alternation of thyristor conduction of the thyristor pairs occurring in sequence more than twice during each half cycle of the inverter output voltage waveform. This causes the voltage pulses appearing across each of machine phases 20a, 20b and 20c to be sinusoidally modulated in proper three phase relationship with one another, which causes induction machine 12 to be excited with sinusoidal voltage. Each of thyristors 18a through 18f is commutated at an appropriate time by a reverse-bias potential supplied from thyristor commutation circuit 26 in accordance with control signals generated by gate controller 24.

Figure 2:
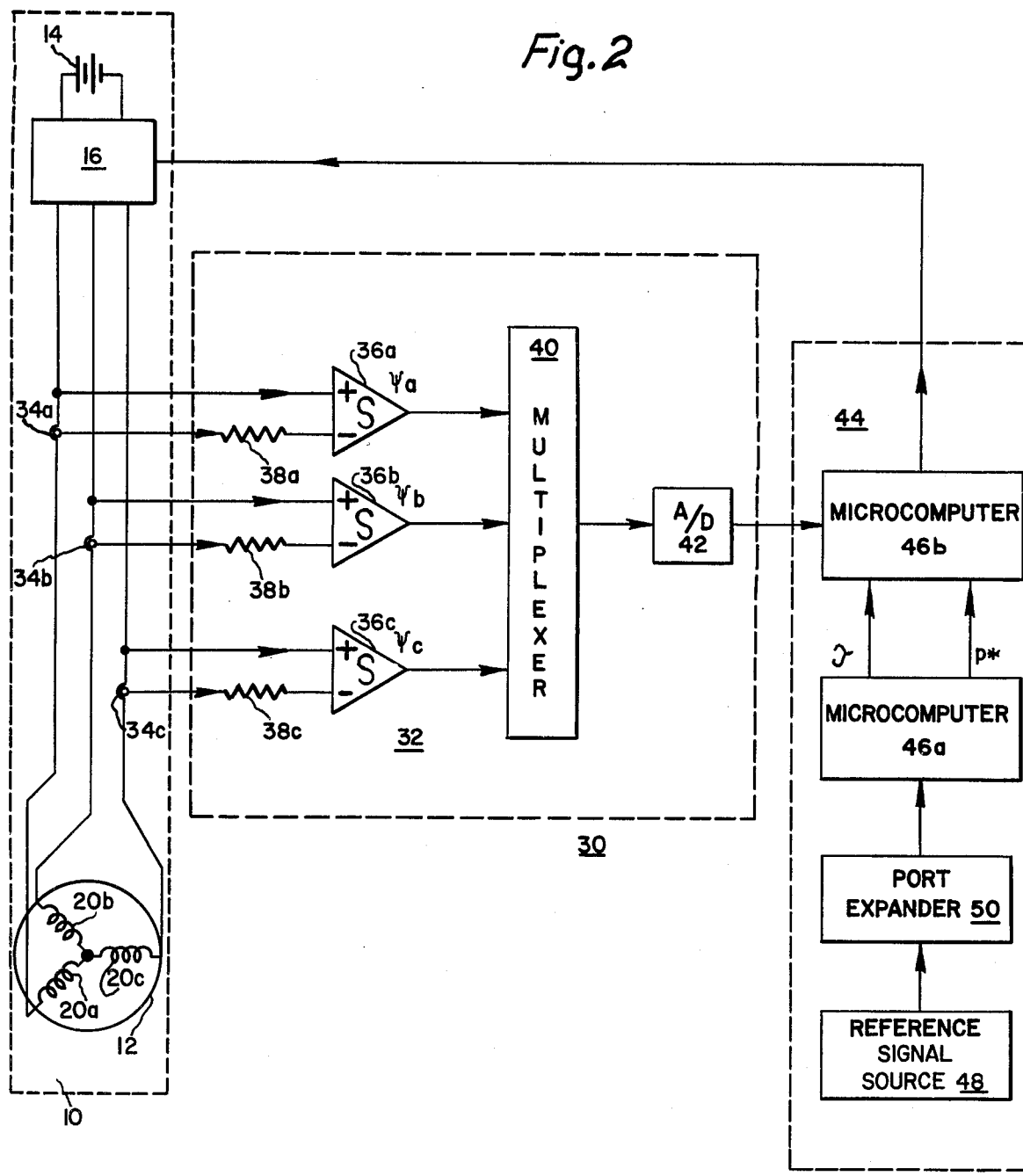
FIG. 2 is a block diagram of the control apparatus of the present invention coupled to the inverter-induction machine drive system of FIG. 1.

Conditioning of inverter output voltage and hence regulation of induction machine 12 torque and speed is achieved by regulating the duration and frequency, respectively, of inverter thyristor conduction. This controls the width and number of output voltage pulses and hence the amplitude and frequency, respectively, of induction machine 12 stator voltage. To this end, a control apparatus 30 for providing control signals to gate controller 24 of inverter 16 to regulate inverter thyristor conduction and hence, motor torque and speed, is shown in FIG. 2. Control apparatus 30 comprises a sensor circuit 32 which is supplied from inverter 16 with voltages proportional to each of the associated inverter output voltage phase components and, which is also supplied through current transformers 34a, 34b and 34c, each coupled in series with inverter 16 and a respective one of induction machine phases 20a, 20b and 20c, with signals proportional to each of the associated inverter output current phase components. Sensor circuit 32 provides, in accordance with the magnitude of inverter output current and induction machine 12 stator voltage, an output signal varying with the actual magnitude of a preselected induction machine parameter, such as induction machine air gap flux, or stator current.

The particular configuration of sensor circuit 32 necessarily depends on the selection of the preselected induction machine parameter. In the presently preferred embodiment, with induction machine air gap flux designated ψ, chosen as the machine feedback parameter, sensor circuit 32 comprises three integrators 36a, 36b and 36c. Integrators 36a, 36b and 36c are each coupled at the first integrator input to a respective one of induction machine phases 20a, 20b and 20c. The second input of each integrator is coupled by a respective one of resistances 38a, 38b and 38c to the output of an associated one of current transformers 34a, 34b and 34c, respectively. Each of resistances 38a–38c has an equivalent ohmic value equal to an associated phase component of induction machine stator resistance. Each of integrators 36a, 36b and 36c provides an output signal proportional to the associated phase component $\psi_a$, $\psi_b$ and $\psi_c$, respectively, of induction machine air gap flux $\psi$ in accordance with the integral of the difference in magnitude between the associated phase components of machine 12 stator voltage and the resistive voltage drop across the induction machine stator. A multiplexer 40 encodes the output signal from each of integrators 36a through 36c, thus providing a unitary, time-multiplexed output signal which is converted by an analog to digital converter 42 into a digital signal. Although not shown, sensor circuit 32 could alternatively be configured of a multiplexer and a microcomputer suitably programmed to calculate a digital signal representative of induction machine air gap flux magnitude in accordance with the integral of the difference in magnitude between induction machine terminal voltage and the resistive voltage drop across the machine stator.

Pulse width modulation operation of inverter 16 is accomplished by processor means 44, comprised of at least one microcomputer, which generates control signals supplied to gate controller 24 of FIG. 1 to vary the frequency and duration of inverter thyristor conduction in accordance with a prescribed relationship between the deviation in magnitude of inverter output current from a preset limit and the deviation in magnitude of the digital reference signal generated by sensor circuit 32, proportional to the actual preselected induction machine parameter magnitude, from a processor-generated reference machine parameter signal representative of the desired preselected induction machine parameter magnitude and varying in frequency and amplitude in accordance with externally varied frequency and amplitude values, respectively. In the embodiment illustrated in FIG. 2, processor 44 comprises a pair of microcomputers 46a and 46b, each microcomputer comprising a model 8048 microcomputer such as is manufactured by Intel Corporation and more fully described in the "MCS User's Manual for the "48" Family of Single Chip Microcomputers" published by INTEL Corp. (1978) under INTEL part no. 9800270D. Microcomputers 46a and 46b are operated as parallel processors, that is, that microcomputers 46a and 46b each simultaneously execute one or more separate stored programs. Pursuant to a pair of stored programs, the details of which are described hereinafter, microcomputer 46a generates a periodic interrupt signal, designated $\tau$, and a three phase reference signal P* being representative of the desired magnitude of the preselected induction machine and varying in frequency and amplitude in accordance with a digital signal generated by microcomputer 46a from data supplied by reference signal source 48 which is coupled to microcomputer 46a by coupling means such as a port expander 50. Reference signal source 48 typically comprises a plurality of switches, usually of the thumbwheel type, which are actuated by user personnel to designate both the frequency and amplitude of the three phase reference signal P* generated by microcomputer 46a. During operation, microcomputer 46a "strobes" each of the switches of reference signal source 48, that is, microcomputer 46a transmits a signal, via port expander 50 to reference signal source 48, and in accordance with the closure of respective switches, the microcomputer determines the designated frequency and amplitude of reference signal P*. Port expander 50 may typically comprise the Model 8243 port expander manufactured by INTEL Corporation. Although not shown, a digital signal, generated by an operator-controlled signal generator, or by an external source, and varying in frequency and amplitude in accordance with the desired frequency and amplitude, respectively, of the preselected induction machine parameter, could be supplied directly to port expander 50 for input to microcomputer 46a.

Microcomputer 46b, purusant to a stored program, provides, in response to the interrupt signal supplied by microcomputer 46a, a three phase control signal which is supplied to inverter 16 to vary the frequency and duration of inverter thyristor conduction in accordance with a prescribed relationship between the deviation in magnitude of the output signal generated by sensor circuit 32 from the reference signal P* generated by microcomputer 46a and the deviation in magnitude of the sensor circuit output signal, which is proportional to actual inverter output current, from a preset value representing the maximum permissible inverter output current.

Figure 3:
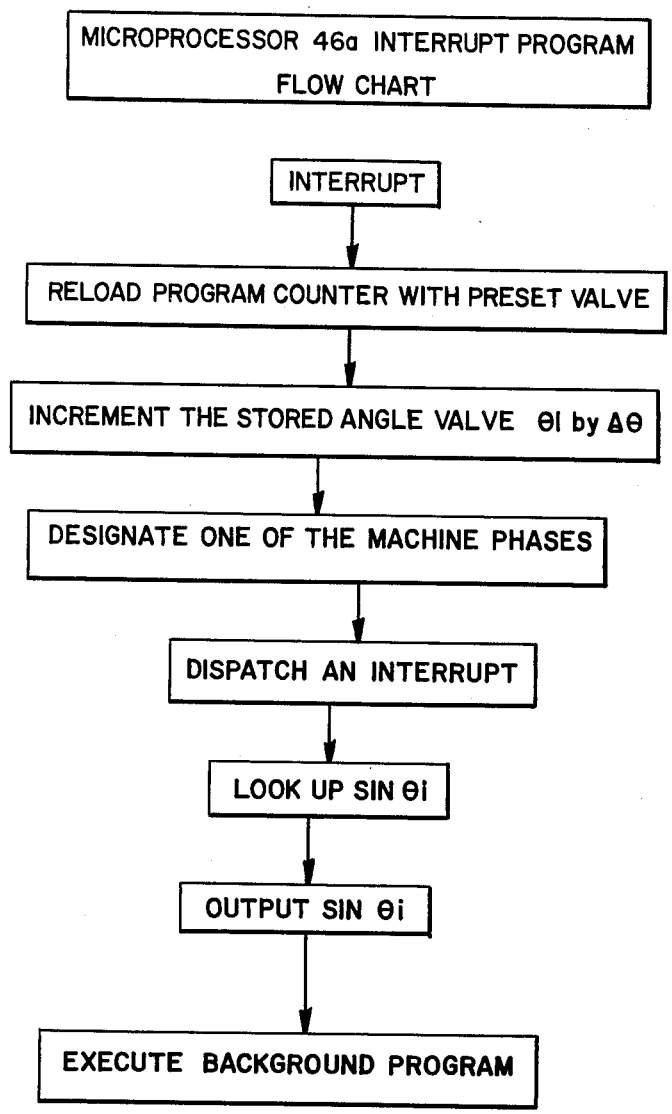
FIGS. 3, 4 and 5 are flow chart representations of the first interrupt program, the background program, and the second interrupt program, respectively, executed by the processor comprising a portion of the control apparatus shown in FIG. 2.

Within microcomputer 46a is a clock (not shown) which is adjusted to provide periodic interrupt pulses every 150$\mu$ seconds. During intervals between interrupt pulses, microcomputer 46a sequentially executes an interrupt program and a background program, the steps of which are set forth in flow chart form in FIGS. 3 and 4, respectively. Referring now to FIG. 3, after generation of an interrupt, microcomputer 46a executes the following steps in sequence. First, a program counter within microcomputer 46a is reloaded and is thereafter continuously decremented. While the program counter is being decremented, an angle value $\theta_i$, initialized at zero and stored in memory, is incremented by the differential angle value $\Delta\theta$ computed during execution of the background program (described hereinafter). After incrementing $\theta_i$, one of the three phases, 20a, 20b or 20c, of induction machine 12a is sequentially designated. When the program counter reaches zero, microcompressor 46a generates an interrupt signal $\tau$ thereafter which is dispatched to microcomputer 46b. The value of sin $\theta_i$ is then determined from a stored reference table in accordance with the previously incremented angle value $\theta_i$. The value of sin $\theta_i$ is supplied to microcomputer 46b and then microcomputer 46a executes its stored background program.

Figure 4:
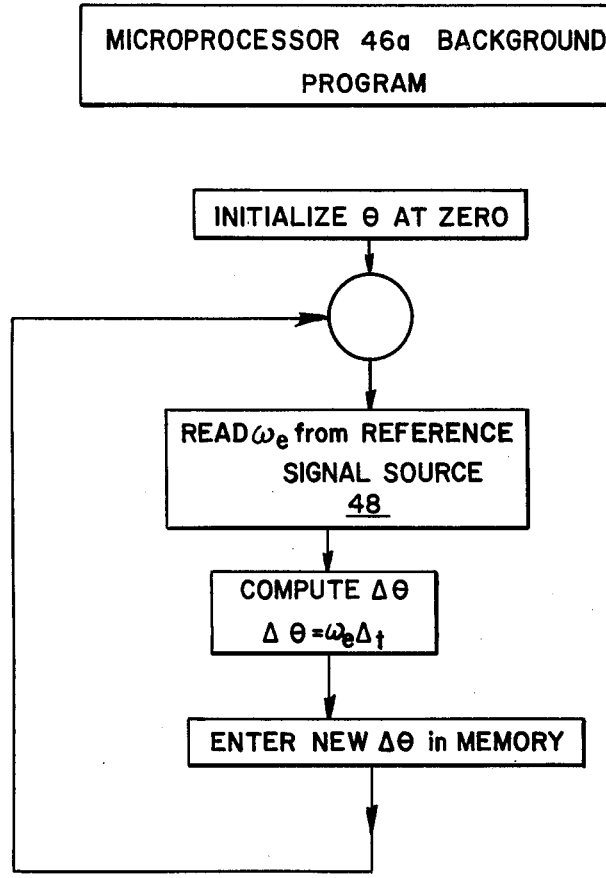

The steps of the background program executed by microcomputer 46a are illustrated in flow chart form in FIG. 4. As described earlier, the angle value $\theta_i$ is initialized at zero. Thereafter, during periodic execution of the background program, a frequency value $\omega_e$, proportional to the operator-designated frequency value, is read from reference signal source 48. Next, the frequency value $\omega_e$ is scaled by the magnitude of $\Delta_t$, where $\Delta_t$ is a differential time value, typically chosen less than 150$\mu$ seconds, yielding a differential angle value $\Delta\theta$ according to the relationship $$\Delta\theta = \omega_e \Delta_t. \tag{1}$$

The calculated value of $\Delta\theta$ is then stored in memory, allowing the angle value $\theta_i$ to be incremented during execution of the interrupt program. In this manner, microcomputer 46a provides the three phase sinusoidal reference signal P* to microcomputer 46b by successive iteration of $\theta_i$ during execution of the interrupt and background programs according to the relationship $$\theta_i = \theta_i(\text{old}) + \Delta\theta \qquad (2)$$

where $\Delta\theta$ is given by equation (1). The amplitude of the reference signal P* varies in accordance with the operator-designated amplitude value.

Figure 5:
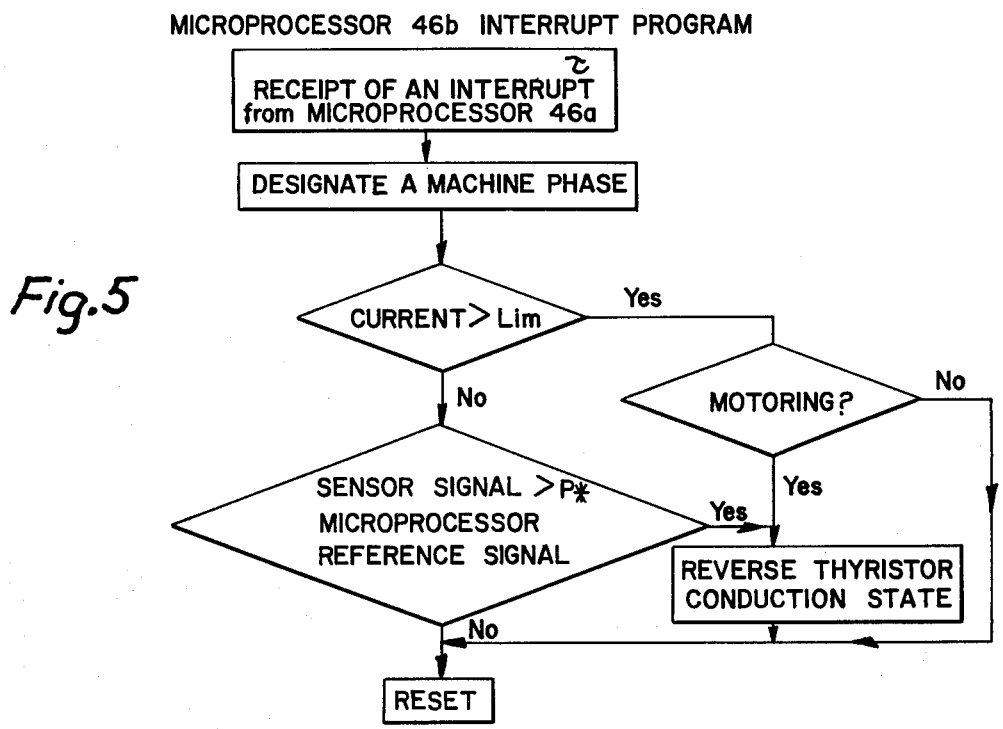

During the 150μ second interval between the interrupts while microcomputer 46a sequentially executes the interrupt and background programs, microcomputer 46b simultaneously executes a separate interrupt program, the steps of which are shown in flow chart form in FIG. 5. Microcomputer 46b, in response to the interrupt signal τ generated by microcomputer 46a, first designates the particular machine phase for which the conduction state of an associated pair of inverter thyristors may be reversed, the designated machine phase being identical to that designated by microcomputer 46a. Microcomputer 46b then tests whether the magnitude of sensor circuit output signal phase component, corresponding to the previously designated machine and which is proportional to the associated inverter output current phase component, exceeds a preset limit, representing maximum allowable inverter current. If the sensor circuit output signal phase component magnitude exceeds the preset limit, that is, the inverter output current magnitude exceeds the maximum allowable inverter output current, and if machine 12 is in the motoring mode (as determined by the sensor circuit output signal polarity), then microcomputer 46b dispatches a control signal to gate controller 24 of inverter 16 shown in FIG. 1 to cause the conduction state of the pair of thyristors coupled to the designated machine phase to be reversed. If machine 12 is in the braking mode, then the thyristors are prevented from switching during this period. Thereafter, microcomputer 46b completes execution of the interrupt program, resets itself and waits for the next interrupt to be generated by microcomputer 46a.

If, however, the magnitude of the associated phase component of inverter output current, as represented by the sensor circuit output signal phase component does not exceed the present current limit, then microcomputer 46b continues execution of the interrupt program, testing whether the associated phase component of the sensor circuit output signal exceeds the associated phase component of the sinusoidal reference signal P* generated by microcomputer 46a. If the condition is met, that is, the sensor circuit output signal phase component magnitude exceeds the sinusoidal reference signal phase component magnitude, then microcomputer 46b dispatches a control signal to gate controller 24 to reverse the thyristor conduction state of the pair of thyristors coupled to the designated machine phase. Microcomputer 46b then completes execution of its interrupt program and resets itself to reexecute the interrupt program upon receipt of subsequent interrupt signal from microcomputer 46a.

Figure 6:
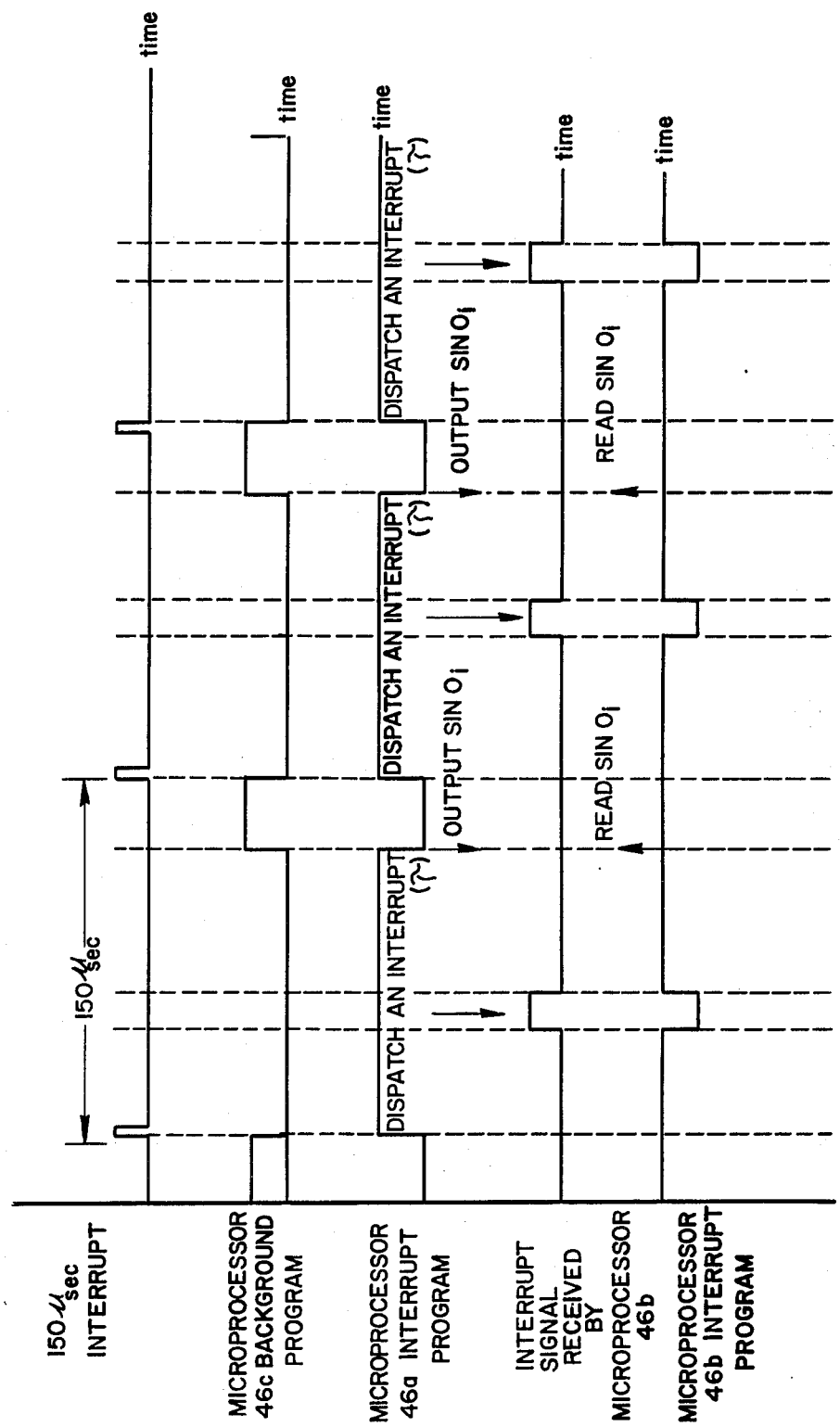
FIG. 6 is a graphical representation of the interrelationship among the background program, the first interrupt program and the second interrupt program which are executed by the processor comprising a portion of the control apparatus of FIG. 2.

The concurrent execution of the interrupt program by microcomputer 46b during sequential execution of the interrupt and background programs by microcomputer 46a is illustrated in FIG. 6. Execution of the stored interrupt program by microcomputer 46a, as described earlier, occurs during the major portion of the 150μ second interval between interrupt pulses. During execution of its interrupt program, microcomputer 46a dispatches an interrupt signal τ to microcomputer 46b causing microcomputer 46b to commence execution of its own stored interrupt program. Just after microcomputer 46b executes the interrupt program step which tests the deviation of the associated sensor circuit output signal phase component magnitude from a preset limit, the value of sin $\theta_i$ (representing the associated machine parameter reference signal P* phase component) is read by microcomputer 46b from microcomputer 46a. Thereafter, microcomputer 46b determines whether the associated phase component of the sensor circuit output signal exceeds the associated machine parameter reference signal phase component computed by microcomputer 46a. Microcomputer 46b then regulates the conduction states of the pair of inverter thyristors coupled to the previously designated machine phase in accordance with the previously described relationship between the deviation in magnitude of the sensor circuit output signal from a preset limit and the deviation in magnitude of the sensor circuit output signal from the reference machine parameter signal P* generated by microcomputer 46a.

The foregoing describes a microcomputer-controlled pulse width modulated inverter-induction machine drive system in which inverter output current and output voltage and hence, induction machine torque and speed are regulated by feedback control of a preselected induction machine parameter.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. For use with an inverter-induction machine drive system comprised of an n-phase induction machine (where n is an integer greater than zero) and an inverter which includes n pairs of solid state switching devices, each pair of said solid state switching devices coupled in series-aiding fashion across a source of potential and adapted for coupling at the junction between switching devices to a respective one of said n induction machine phases, improved apparatus for controlling torque and speed of said induction machine by controlling amplitude and frequency of inverter output voltage in accordance with an externally-varied amplitude value and frequency value, respectively, comprising:

(a) sensor circuit means for generating, from inverter output current and output voltage, an n phase output signal which varies in accordance with the actual magnitude of machine flux; and (b) means coupled to said sensor circuit and to said inverter for generating an n-phase reference signal, the amplitude and frequency of which varies in accordance with the magnitude of said externally varied amplitude value and said frequency value, respectively, and for supplying an n-phase control signal to said inverter to vary the conduction of each of said inverter solid state switching devices of each of said pairs of inverter solid state switching device, said n-phase control signal varying in accordance with a prescribed relationship between the deviation in magnitude of said sensor circuit output signal from said reference signal and the deviation in magnitude of said sensor circuit output signal from a preset limit, said preset limit representing a predetermined maximum inverter current.

2. The invention according to claim 1 wherein said sensor circuit means comprises:
(a) first circuit means for providing an n-phase output signal proportional to the actual magnitude of induction machine flux in accordance with the magnitude of inverter output current and output voltage;
(b) second circuit means coupled to said first circuit means for time-multiplexing said first circuit means n-phase output signal; and
(c) third circuit means coupled to said second circuit means for converting the second means time-multiplexed n-phase output signal into a digital signal.

3. The invention according to claim 2 wherein said first circuit means comprises:
(a) a plurality of n integrators, each of said integrators having a first and second input, said first input of each integrator being supplied with voltage proportional to an associated phase component of inverter output voltage;
(b) a plurality of n current sensors each coupled in series between a respective one of said n machine phases and said inverter, each current sensor providing an output signal proportional to the actual magnitude of an associated phase component of inverter output current; and
(c) a plurality of n resistances, each of said n resistances having an ohmic value proportional to a respective phase component of induction machine stator resistance, each of said n resistances coupled between the output of a respective one of said n current sensors and the second input of each of a respective one of said integrators;
(d) each of said integrators providing an output signal proportional to the integral of the difference in magnitude between input signals supplied to the first and second integrator inputs of each of said integrators, respectively.

4. The invention according to claim 1 wherein said means coupled to said sensor circuit and to said inverter comprises:
(a) reference signal source means for generating a digital signal varying in frequency and amplitude in accordance with an externally-varied frequency value and amplitude value, respectively;
(b) first microcomputer means coupled to said reference signal source means, said first microcomputer means generating a periodic interrupt signal and an n-phase reference signal being representative of the desired induction machine flux magnitude and varying in accordance with said digital signal;
(c) second microcomputer means coupled to said first microcomputer means and said inverter for providing to said inverter in response to said first microcomputer interrupt signal, control signals to vary the conduction intervals of each of said solid state switching devices in accordance with a prescribed relationship between the deviation in magnitude of said sensor circuit output signal from said first microcomputer reference signal and the deviation in magnitude of said sensor circuit output signal from a preset value.

5. The invention according to claim 4 further including port expander means coupling said reference signal source means to said first microcomputer means.

6. A microcomputer-controlled pulse width modulated inverter-induction machine drive system comprising:
(a) a potential source;
(b) an n phase induction machine where n is an integer greater than zero;
(c) an inverter configured of n pairs of solid state switch devices, the switching devices of each of said pairs coupled in series-aiding fashion across said potential source and adapted for coupling at the junction between solid state switching devices to a respective one of said n induction machine phases, each of said solid state switching devices of each of said n pairs being alternately rendered conductive in sequence for intervals of varying duration to supply said n-phase induction machine with an alternating current potential; and
(d) control means having
(1) sensor circuit means coupled to said inverter for generating, from inverter output current and output voltage, an n-phase output signal which varies in accordance with actual flux magnitude; and
(2) processor means coupled to said sensor circuit and said inverter, said processor means comprised of a first and second microcomputer, said first microcomputer generating an n-phase reference signal representative of the desired induction machine flux magnitude and varying in amplitude and frequency in accordance with the magnitude of an externally-varied amplitude value and frequency value, respectively, and generating a periodic interrupt signal, said second microcomputer coupled to said first microcomputer and generating, in response to said first microcomputer periodic interrupt signal, an n-phase control which is supplied to said inverter to vary the conduction intervals of each of said n pairs of inverter solid state switches, said second microcomputer n-phase control signal varying in accordance with a prescribed relationship between the deviation in magnitude of said sensor circuit output signal from said first microcomputer reference signal and the deviation in magnitude of said sensor circuit output signal from a preset value.

7. The invention according to claim 6 wherein said sensor circuit means comprises:
(a) first circuit means for providing, in accordance with inverter output current and voltage, said n phase output signal;
(b) second circuit means coupled to said first circuit means for time multiplexing said first circuit means output signal; and
(c) third circuit means coupled to said second circuit means for converting said second circuit means time multiplexed signal into a digital signal.

* * * * *